(12) United States Patent
Asami (10) Patent No.: US 7,847,818 B2
(45) Date of Patent: Dec. 7, 2010

(54) TELEVISION WITH DISC LOADER, DISC PRESENCE DISPLAY DEVICE

(75) Inventor: Kimiharu Asami, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1224 days.

(21) Appl. No.: 11/444,908

(22) Filed: Jun. 1, 2006

(65) Prior Publication Data

US 2006/0280487 A1 Dec. 14, 2006

(30) Foreign Application Priority Data

Jun. 1, 2005 (JP) .............................. 2005-161056

(51) Int. Cl.
*H04N 9/11* (2006.01)
*H04N 7/18* (2006.01)

(52) U.S. Cl. ...................................... 348/111; 348/126

(58) Field of Classification Search ................. 348/111, 348/126, 836, 552, 569; 717/168; 360/74.5
See application file for complete search history.

(56) References Cited

U.S. PATENT DOCUMENTS 5,055,950 A * 10/1991 Kimura et al. ............. 360/74.5
5,488,427 A * 1/1996 Kayashima et al. ......... 348/569
5,724,102 A * 3/1998 Harrison et al. ............ 348/552
6,604,235 B1 * 8/2003 Harrison et al. ............ 717/168

FOREIGN PATENT DOCUMENTS

JP 5-21397 3/1993

OTHER PUBLICATIONS

Mechanical English Translation of JP05-021397, 2 pages, May 1993.

* cited by examiner

*Primary Examiner*—Gims S Philippe
(74) *Attorney, Agent, or Firm*—Osha Liang LLP (57) ABSTRACT

The present invention is directed to eliminate mistaken recognition of the presence of the disc even when displaying the presence of the disc with one light emitting element. In a television incorporating a slot-in type disc loader in which an LED emits light with a pulse signal output from an output terminal of the microcomputer when the power is turned OFF, which light of the LED is interrupted by the insertion of the disc thereby turning ON the power, the display control signal fixed to "L" is output from the output terminal when the pulse signal "L/H" is input to the input terminal of the microcomputer from the disc detecting section when the power is turned OFF and the disc is not inserted. The light emitting diode does not flash and is in a light out state by the display control signal, and thus the fact that the disc is not present in the slot is accurately notified.

2 Claims, 7 Drawing Sheets

| | POWER | DISC | T1 OUTPUT | T2 OUTPUT | T3 OUTPUT | LED 2 |
|---|---|---|---|---|---|---|
| (1) | ON | PRESENT | H | H | H | LIGHT ON |
| (2) | ON | NOT PRESENT | H | L | L | LIGHT OUT |
| (3) | OFF | PRESENT | H/L | H | H | LIGHT ON |
| (4) | OFF | NOT PRESENT | H/L | L/H | L | LIGHT OUT |

POWER OFF/DISC PRESENT

FIG. 4D

POWER OFF/DISC NOT PRESENT

TELEVISION WITH DISC LOADER, DISC PRESENCE DISPLAY DEVICE

BACKGROUND OF THE INVENTION

1. Field of the Invention

The present invention relates to a television with disc loader for taking in discs such as DVD, and a disc presence display device mounted on equipment such as television.

2. Description of the Related Art

In a disc compatible image equipment such as a DVD player integrated television, a disc loader for taking the disc inside is built in the equipment main body. Generally, there are various disc loading types such as tray type, slot-in type, caddy type, shell type and the like, but the tray type and the slot-in type are mainly adopted for television and the like. The tray type is a type in which the disc is placed on a tray and conveyed inside, wherein the tray is pulled out by a button operation to place the disc, and the disc is taken inside with the tray with a further button operation. The slot-in type is a type in which the disc is directly inserted into the slot to be taken inside, wherein when one part of the disc is inserted into the slot, the disc is automatically taken inside by the disc loader. The slot-in type is suitable for a flat screen television having a short depth such as liquid crystal television since it does not involve pulling in and out the tray.

In a case of the tray type, even if one forgets to take out the previously inserted disc, a check can be made whether or not the previous disc has been forgotten to be taken out since the tray is pulled out when inserting a new disc, and thus the problem of accidentally placing two discs is prevented. In the slot-in type, however, a new disc may be inserted even though a disc is left inside the slot since the inside of the slot cannot be visually observed from the outside. This may cause collision or damage of the discs, or damage to the loading mechanism by forced insertion. Thus, a function of detecting the presence of the disc in the slot, and displaying a fact that the disc is present in the slot by turning on or turning off the light emitting element based on the detected result is necessary.

In the slot-in type, when the power of the equipment is turned OFF, if a disc is inserted into the slot, such insertion is simultaneously detected by a photosensor, which then turns ON the power and drives the disc loader to take in the disc. An intermittent pulse light is projected instead of a continuous light from the light projecting element of the photosensor when the power is turned OFF. The pulse light is chosen to save power, and insertion of the disc can be detected even with the pulse light. However, if the light projecting element is pulse driven when the power is turned OFF, the output of the photosensor is a pulse output when the disc is not inserted in the slot while the power is turned OFF, and thus the light emitting element displaying the presence of the disc flashes, which may cause the user to mistakenly recognize or fear that the equipment has broken down, or mistakenly recognize that the disc is present and mistakenly perform reproducing operation or recording operation even though the disc is not present.

An in-vehicle CD player is disclosed in Japanese Laid-Open Utility Model Publication No. 5-21397 in which two light emitting diodes having different light emitting colors are arranged, wherein one light emitting diode is lighted when the disc is inserted, and the other light emitting diode is lighted when the disc is not inserted to allow the presence of the disc to be recognized by the light emitting color. In this relevant document, mistaken recognition of the presence of the disc is prevented, but the cost increases since two light emitting diodes are necessary to display the presence of the disc.

Further, since this relevant document proposes to detect the disc with a switch that turns ON when chucking the disc, and not to detect the disc with the pulse light when the power is turned OFF, a solution to the problem of mistakenly recognizing with the flashing of the light emitting diode as described above is not given.

In the television with disc loader adopting the slot-in type, when pulse driving the light projecting element for disc detection when the power is turned OFF, if the presence of the disc is displayed with one light emitting diode, the light emitting diode flashes when the disc is not inserted in the power OFF state, and the user may mistakenly recognize breakdown or that disc is present.

SUMMARY OF THE INVENTION

The present invention aims to, in view of the above problem, provide a television with disc loader and a disc presence display device in which the presence of the disc is not mistakenly recognized even if the presence of the disc is displayed with one light emitting element.

A television with disc loader according to the present invention comprises a slot for inserting and ejecting a disc; a slot-in type disc loader for taking in the disc inserted into the slot; a disc detecting section, including a light projecting element and a light receiving element, for detecting the disc when a light from the light projecting element to the light receiving element is interrupted when the disc is inserted into the slot; a microcomputer for determining the output of the disc detecting section and outputting a display control signal based on the detected result; and a displaying section for displaying the presence of the disc in the slot by a light emitting state of a light emitting diode that is lighted on or lighted out by the display control signal. The light projecting element in the disc detecting section is driven by a continuous signal output from the microcomputer and projects a continuous light when the power of the television is turned ON, and is driven by a pulse signal output from the microcomputer and projects a pulse light when the power of the television is turned OFF, the power of the television being turned ON in response to the interrupting of the pulse light by the disc and the detection of the disc. The feature of the present invention lies on the fact that, in the television with disc loader, the microcomputer determines the output of the disc detecting section as the pulse signal when the power of the television is turned OFF and the disc is not detected by the disc detecting section, and outputs the display control signal for lighting out the light emitting diode to the displaying section.

A disc presence display device according to the present invention is a disc presence display device mounted on equipment such as television incorporating a slot-in type disc loader, the device comprises a disc detecting section for detecting the disc; a controlling section for determining the output of the disc detecting section and outputting a display control signal based on the determined result; and a displaying section for displaying the presence of the disc by a light emitting state of a light emitting element that is lighted on or lighted out by the display control signal. The disc detecting section includes a light projecting element and a light receiving element, and detects the disc when a light from the light projecting element to the light receiving element is interrupted by the disc. Further, the light projecting element projects a continuous light when the power of the equipment is turned ON and projects a pulse light when the power of the equipment is turned OFF. The feature of the present invention lies on the fact that, in the disc presence display device, the controlling section determines the output of the disc detecting section as the pulse signal when the power of the equipment is turned OFF and the disc is not detected by the disc detecting section, and outputs the display control signal for lighting out the light emitting element to the displaying section.

Therefore, when the power is turned OFF and the disc is not detected, the display control signal for lighting out the light emitting element is provided to the displaying section, so that the light emitting element does not flash and is in the light out state. Thus mistakenly recognizing break down, or mistakenly recognizing that the disc is present when the disc is not in the slot are eliminated, and the presence of the disc is accurately notified to the user.

According to the present invention, a television with disc loader and a disc presence display device in which the presence of the disc is not mistakenly recognized even when the presence of the disc is displayed with one light emitting element are provided.

DETAILED DESCRIPTION OF THE PREFERRED EMBODIMENTS

The embodiment of the present invention will now be described with reference to the drawings.

Figure 1:
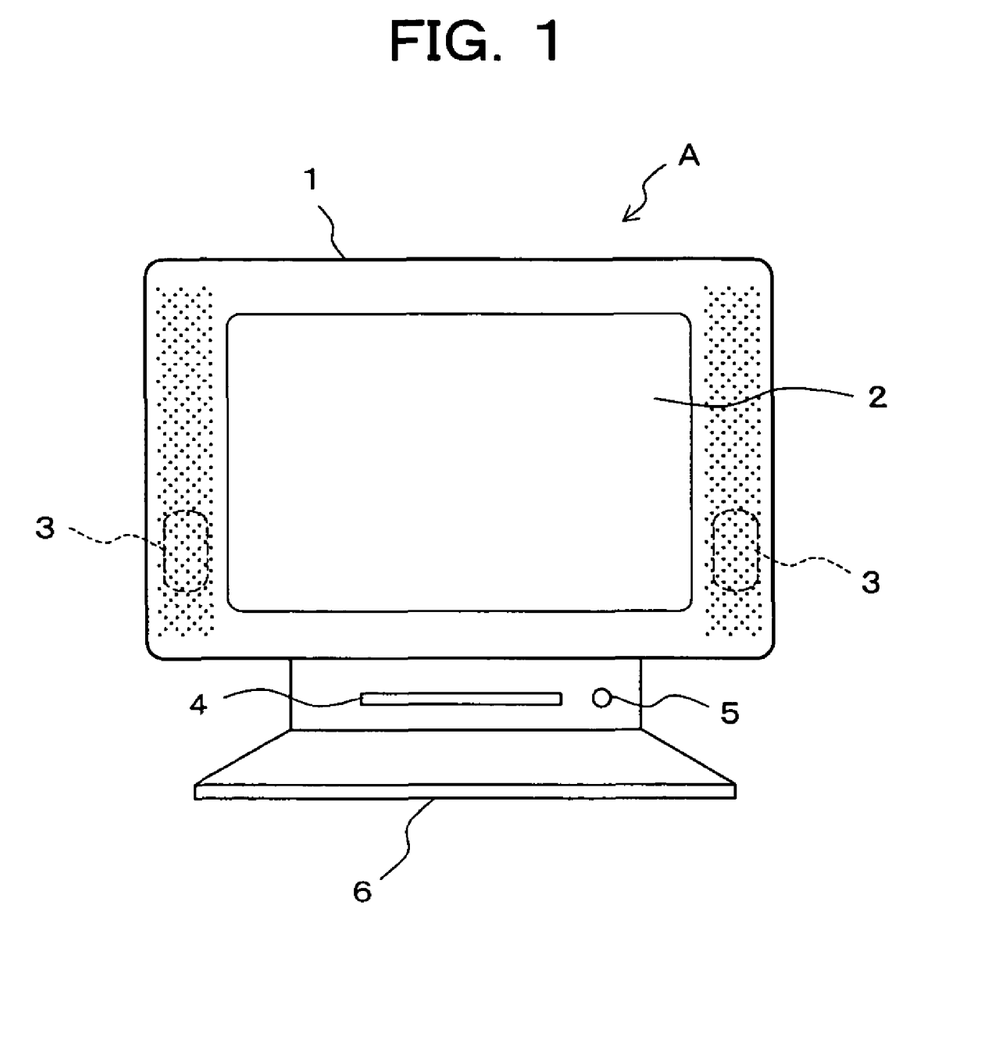
FIG. 1 is a front view showing one example of a television applied with the present invention.

FIG. 1 is a front view showing one example of a liquid crystal television integrated with DVD player (hereinafter referred to simply as "television") applied with the present invention. Reference character 1 is a frame of the television A, reference character 2 is a liquid crystal panel attached to the frame 1, reference character 3 is a pair of speakers arranged on both left and right sides of the back surface of the frame 1, reference character 4 is a slot for inserting and ejecting the disc, reference character 5 is a light emitting element for displaying the presence of the disc in the slot 4, and reference character 6 is a supporting stand. A light source for back light, a circuit board and the like are arranged on the back surface of the liquid crystal panel 2. The television A displays pictures on the display screen of the liquid crystal panel 2 and outputs sound from the speaker 3 through operation of the remote controller (not shown). The recordation and reproduction etc. for the disc inserted into the slot 4 are also performed through the operation of the remote controller.

Figure 2:
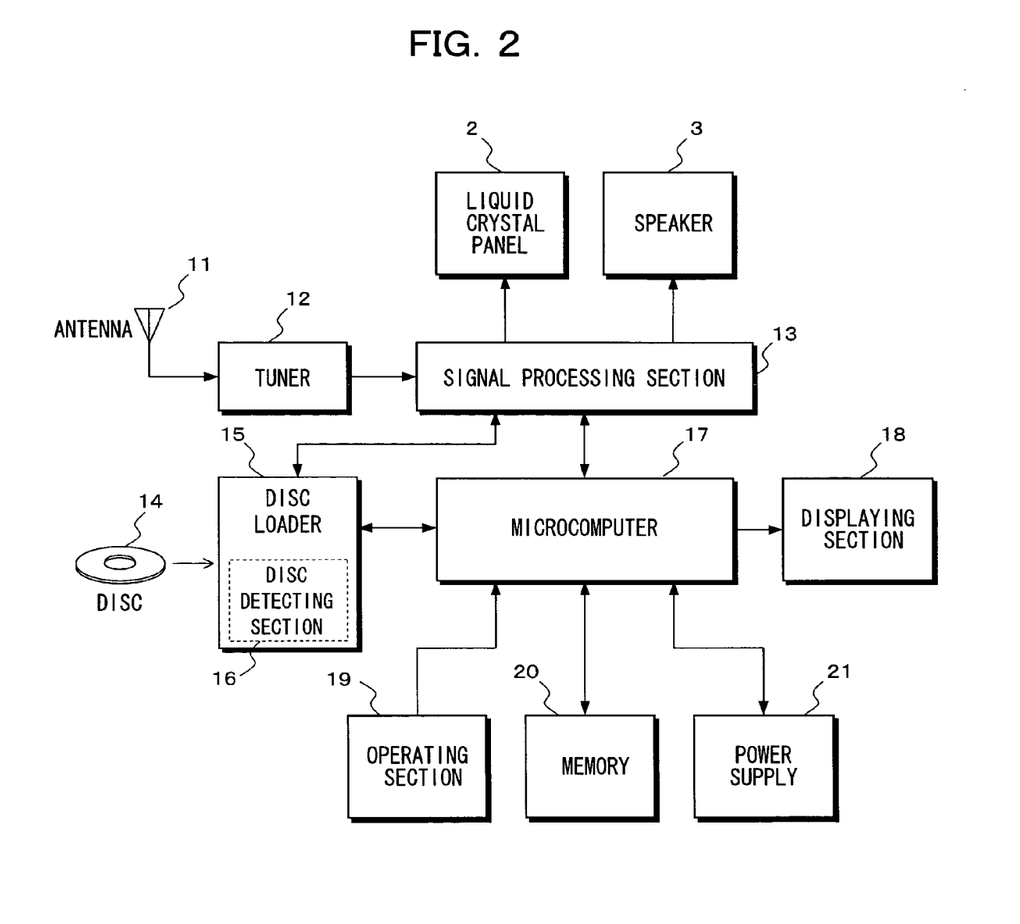
FIG. 2 is a block diagram showing an electrical configuration of the television.

FIG. 2 is a block diagram showing an electrical configuration of the television A. Reference character 11 is an antenna for receiving a broadcast signal, the reference character 12 is a tuner for extracting the broadcast signal of a predetermined channel, and the reference character 13 is a signal processing section for processing the video signal or sound signal. The reference character 2 is the liquid crystal panel, and the reference character 3 is the speaker, same as those shown in FIG. 1. Reference character 14 is a disc such as DVD or CD, the reference character 15 is a slot-in type disc loader for taking in the disc 14 inserted into the slot 4 (FIG. 1), and the reference character 16 is a disc detecting section arranged in the disc loader 15. Reference character 17 is a microcomputer for controlling the operation of the television A, the reference character 18 is a displaying section for displaying the presence of the disc 14 in the slot 4, the reference character 19 is an operating section including the remote controller and the like, the reference character 20 is a memory including ROM, RAM and the like, and the reference character 21 is a power supply for supplying voltage to each section. The microcomputer 17 configures the controlling section in the present invention.

Figure 3:
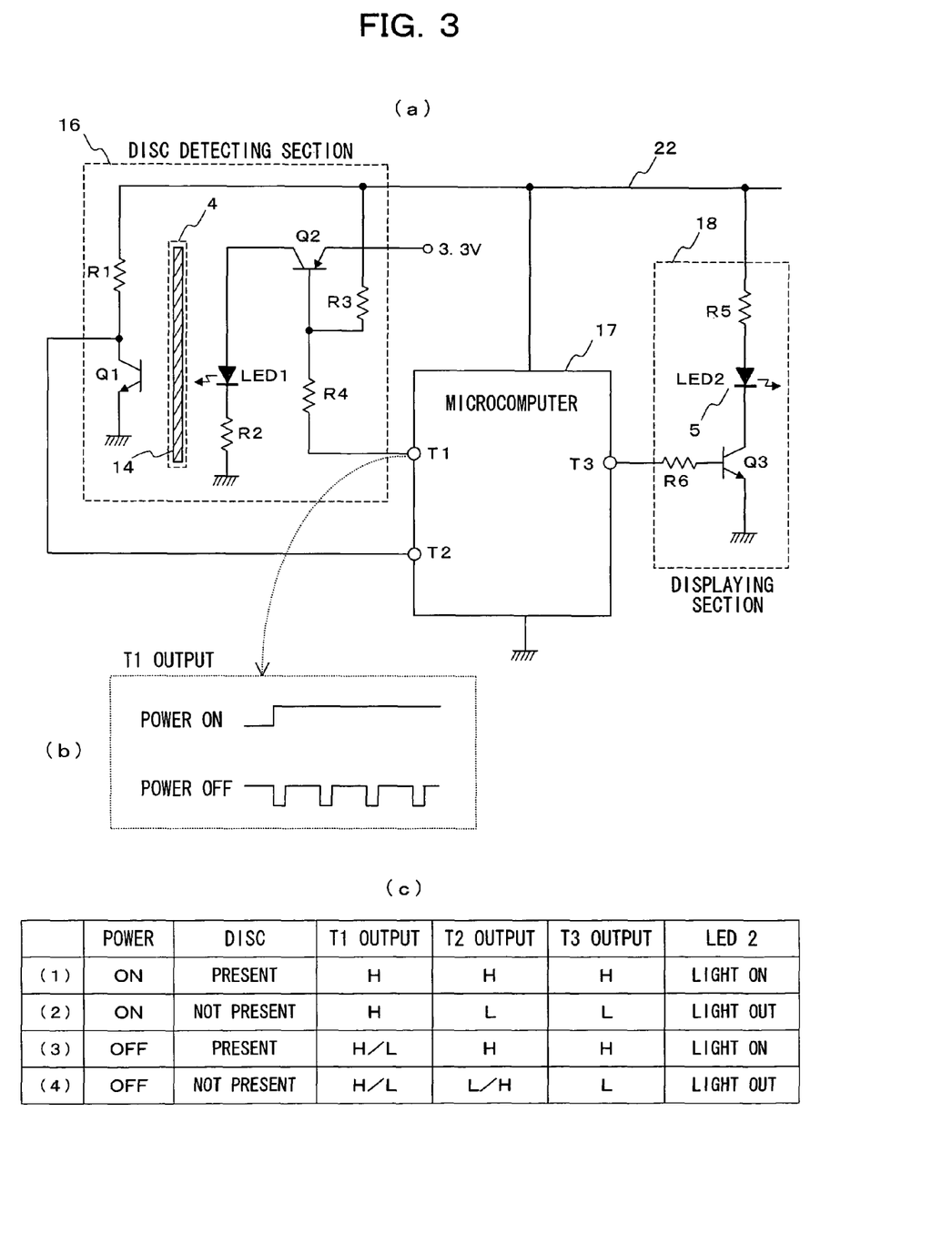
FIG. 3 is a view showing a disc presence display device according to the present invention.

In FIG. 3, (a) is a circuit diagram showing one example of the disc presence display device, which is one feature of the present invention. Reference characters 16, 17, 18 are the disc detecting section, microcomputer, and the displaying section shown in FIG. 2. The LED 2 of the displaying section 18 configures the light emitting element 5 shown in FIG. 1. Although the slot 4 is horizontally arranged in FIG. 1, the slot 4 is arranged in the vertical direction in FIG. 3(a) for the sake of convenience.

The disc detecting section 16 is configured by a light emitting diode LED 1 serving as a light projecting element, a phototransistor Q1 serving as a light receiving element, a transistor Q2 for controlling the light emitting diode LED 1, and resistors R1 to R4. The emitter of the phototransistor Q1 is grounded, and the collector is connected to a direct current voltage line 22 via the resistor R1. The direct current voltage line 22 is constantly supplied with the direct current voltage for driving the disc detecting section 16, the microcomputer 17, and the displaying section 18 from the power supply 21 (FIG. 1) whether or not the power of the television is turned ON/OFF. The collector of the phototransistor Q1 is connected to an input terminal T2 of the microcomputer 17. The cathode of the light emitting diode LED 1 is grounded via the resistor R2, and the anode is connected to the collector of the transistor Q2. The base of the transistor Q2 is connected to the direct current voltage line 22 via the resistor R3, and connected to the output terminal T1 of the microcomputer 17 via the resistor R4. The emitter of the transistor Q2 is connected to the power supply of 3.3V. The voltage of 3.3V is also constantly supplied whether or not the power of the television is ON/OFF. The light emitting diode LED 1 and the phototransistor Q1 configure the photo-sensor. The disc 14 inserted into the slot 4 is detected if the light projected from the light emitting diode LED 1 to the phototransistor Q1 is interrupted by the disc 14.

The microcomputer 17 includes an output terminal T1, input terminal T2, and output terminal T3. The microcomputer 17 further includes various terminals necessary for controlling the television other than the terminals T1 to T3 but they are omitted in the figure since they are not directly relevant to the present invention. The output terminal T1 is a terminal for outputting the drive signal of the light emitting diode LED 1. As shown (b) in FIG. 3, a continuous signal is output when the power of the television is turned ON (power ON), and an intermittent pulse signal is output when the power of the television is turned OFF (power OFF). The ON/OFF of the power is performed, for example, by operating the power switch of the remote controller. The input terminal T2 is a terminal input with the output signal of the disc detecting section 16. The microcomputer 17 determines the signal input to the input terminal T2 to recognize the presence of the disc 14. The output terminal T3 outputs the display control signal based on the presence of the disc to the displaying section 18.

The displaying section 18 is configured by a light emitting diode LED 2 for displaying the presence of the disc, the transistor Q3 for controlling the light emitting diode LED 2, and the resistors R5, R6. The base of the transistor Q3 is connected to the output terminal T3 of the microcomputer 17 via the resistor R6. The emitter of the transistor Q3 is grounded, and the collector is connected to the direct current voltage line 22 via a series circuit including the resistor R5 and the light emitting diode LED 2.

In FIG. 3, (c) shows the operating pattern of the circuit of (a). The circuit operation for each case of (1) to (4) will now be explained with reference to FIG. 4A to FIG. 4D.

Figure 4A:
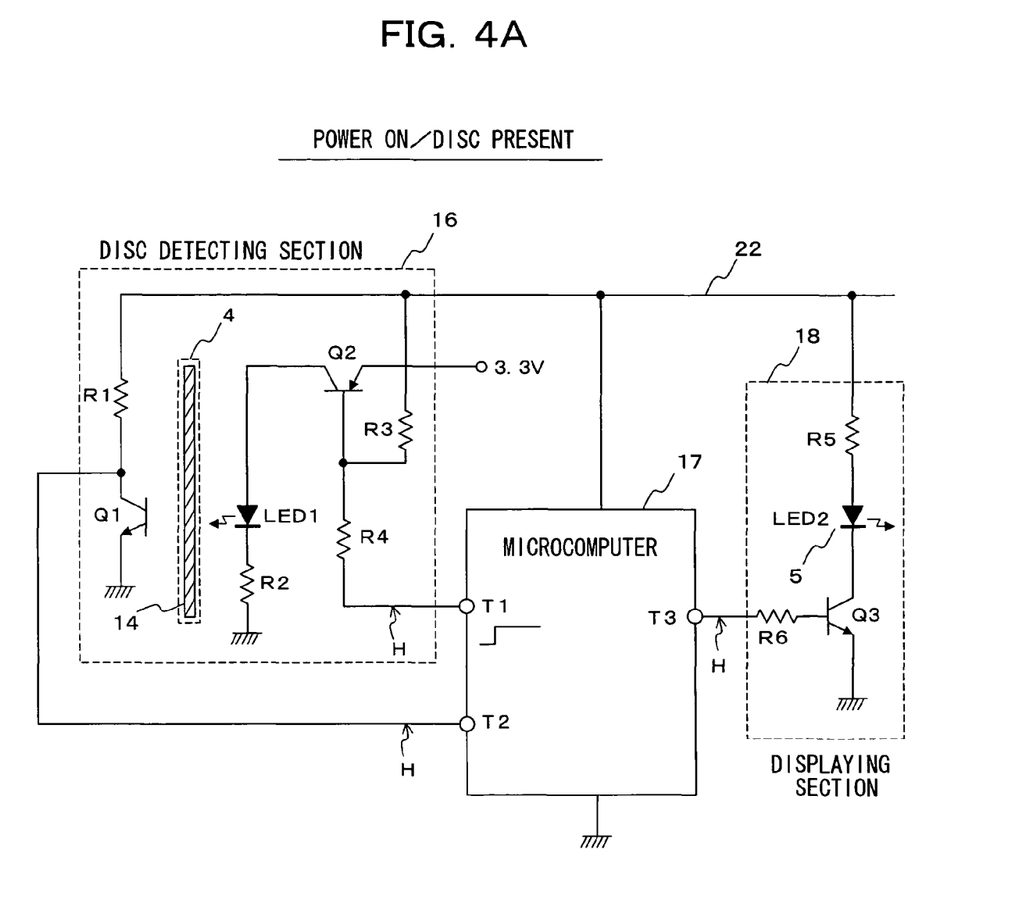
FIG. 4A is a circuit diagram explaining the operation of the disc presence display device.

(1) is a case of when the disc 14 is inserted into the slot 4 when the power is turned ON. As shown in FIG. 4A, the continuous signal of "H (high)" is output from the output terminal T1 of the microcomputer 17, thereby turning ON the transistor Q2 and electrically conducting the light emitting diode LED 1. The light emitting diode LED 1 thereby projects the continuous light. Since the light is interrupted by the disc 14 inserted into the slot 4 and is not received at the phototransistor Q1, the phototransistor Q1 is turned OFF and "H" signal is input to the input terminal T2 of the microcomputer 17. When determining that the signal input to the input terminal T2 is "H", the microcomputer 17 outputs the "H" display control signal from the output terminal T3. The display control signal is provided to the base of the transistor Q3 via the resistor R6, thereby turning ON the transistor Q3. As the transistor Q3 is turned ON, the light emitting diode LED 2 becomes electrically conductive and is lighted, and "disc present" is displayed.

Figure 4B:
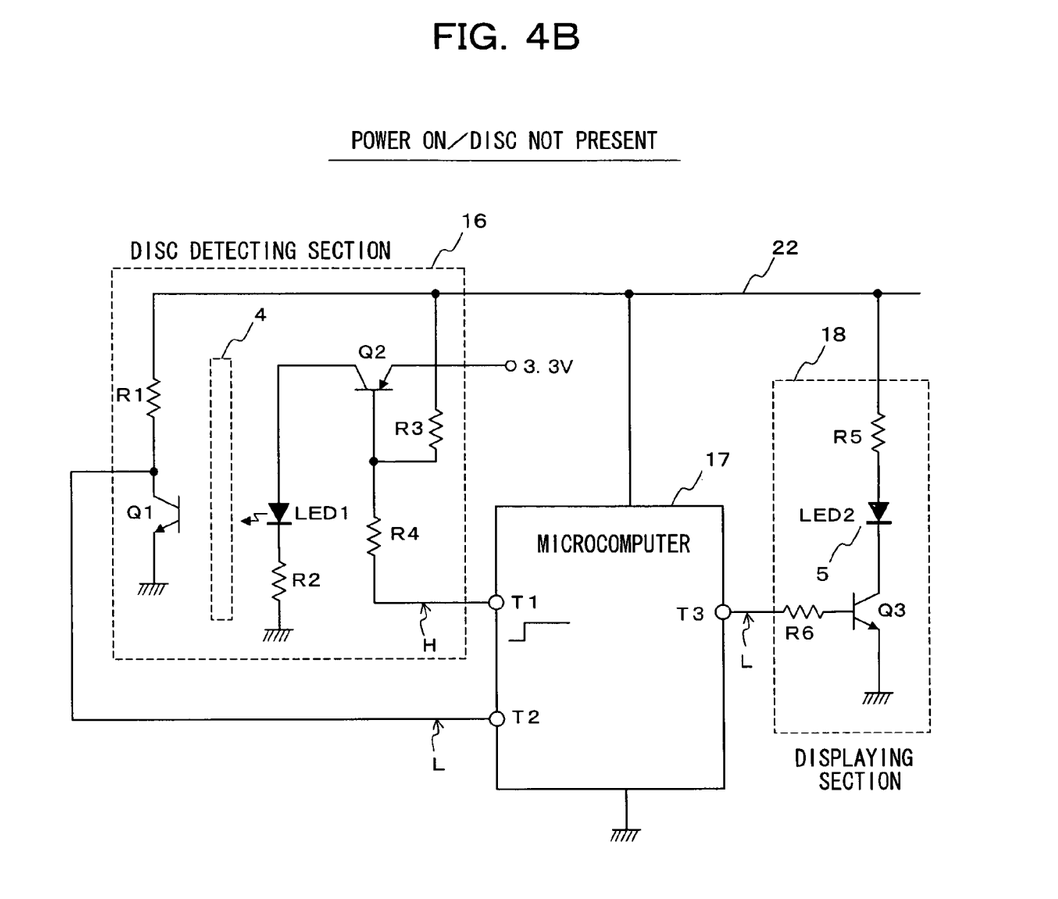
FIG. 4B is a circuit diagram explaining the operation of the disc presence display device.

(2) is a case of when the disc 14 is not inserted into the slot 4 when the power is turned ON. As shown in FIG. 4B, the continuous signal of "H" is output from the output terminal T1 of the microcomputer 17, thereby turning ON the transistor Q2 and electrically conducting the light emitting diode LED 1. The light emitting diode LED 1 thereby projects the continuous light. Since the disc is not inserted into the slot 4, the light from the light emitting diode LED 1 is not interrupted and is received at the phototransistor Q1. Therefore, the photo-transistor Q1 is turned ON and "L" signal is input to the input terminal T2 of the microcomputer 17. When determining that the signal input to the input terminal T2 is "L", the microcomputer 17 outputs the "L" display control signal from the output terminal T3. The display control signal is provided to the base of the transistor Q3 via the resistor R6, thereby turning OFF the transistor Q3. As the transistor Q3 is turned OFF, the light emitting diode LED 2 is not lighted, and "disc not present" is displayed.

Figure 4C:
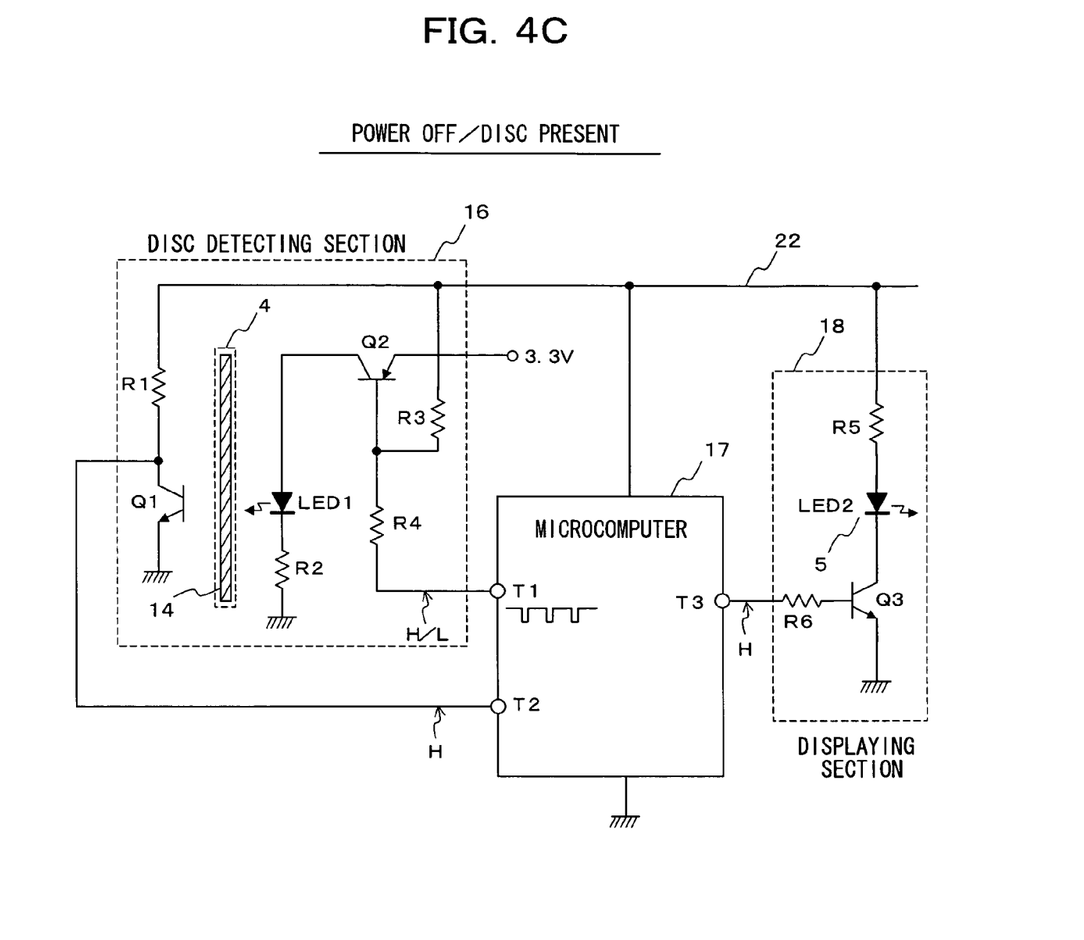
FIG. 4C is a circuit diagram explaining the operation of the disc presence display device.

(3) is a case of when the disc 14 is inserted into the slot 4 when the power is turned OFF. As shown in FIG. 4C, the pulse signal of "H/L" is output from the output terminal T1 of the microcomputer 17, thereby turning ON/OFF the transistor Q2. The light emitting diode LED 1 thereby projects the pulse light. The light is interrupted by the disc 14 inserted in the slot 4 and is not received at the phototransistor Q1. The phototransistor Q1 is thus turned OFF and "H" signal is input to the input terminal T2 of the microcomputer 17. When determining that the signal input to the input terminal T2 is "H", the microcomputer 17 outputs the "H" display control signal from the output terminal T3. The display control signal is provided to the base of the transistor Q3 via the resistor R6, thereby turning ON the transistor Q3. As the transistor Q3 is turned ON, the light emitting diode LED 2 becomes electrically conductive and lighted, and "disc present" is displayed.

Figure 4D:
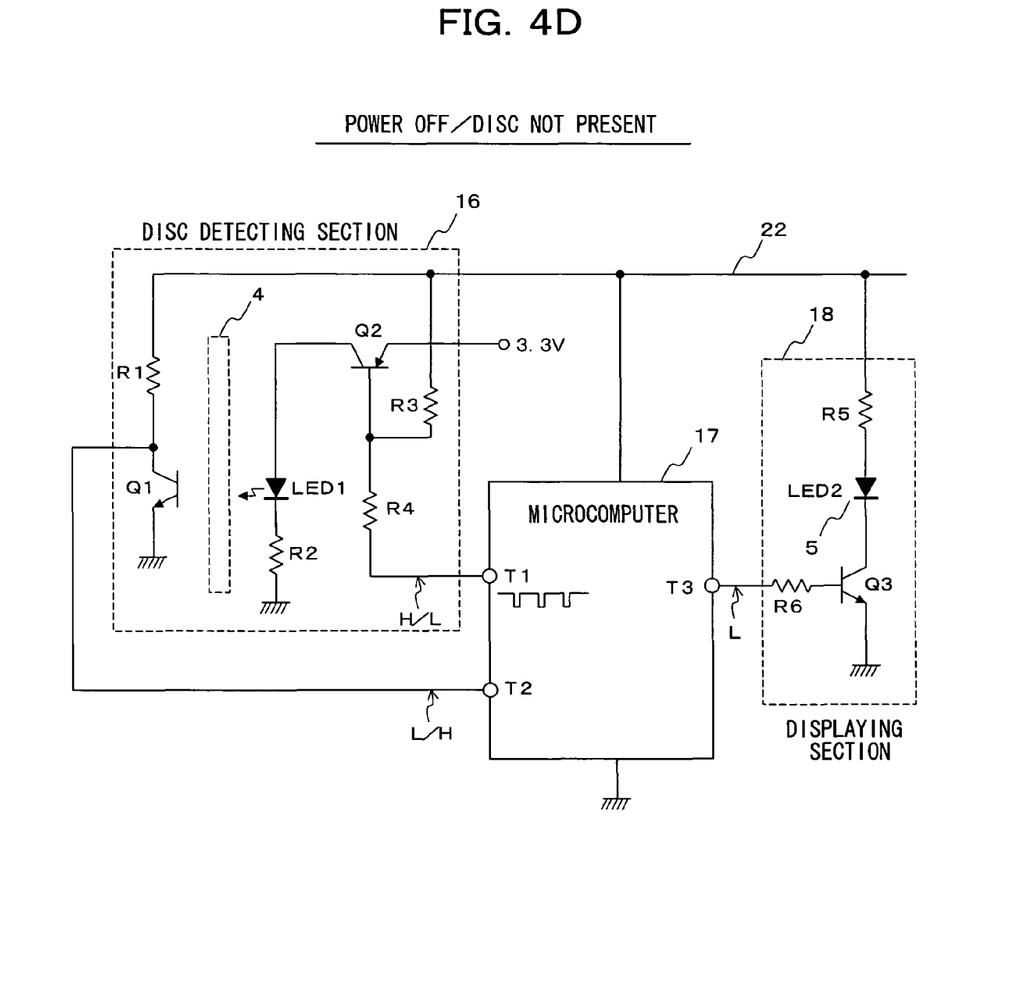
FIG. 4D is a circuit diagram explaining the operation of the disc presence display device.

(4) is a case of when the disc 14 is not inserted into the slot 4 when the power is turned OFF. As shown in FIG. 4D, the pulse signal of "H/L" is output from the output terminal T1 of the microcomputer 17, thereby turning ON/OFF the transistor Q2. The light emitting diode LED 1 thereby projects the pulse light. Since the disc is not inserted into the slot 4, the pulse light from the light emitting diode LED 1 is not interrupted and is received at the photo-transistor Q1. Therefore, the phototransistor Q1 is turned ON/OFF, and the "L/H" signal inverted from the "H/L" signal from the output terminal T1 is input to the input terminal T2 of the microcomputer 17. When determining that the signal input to the input terminal T2 is "L/H", the microcomputer 17 outputs the "L" display control signal from the output terminal T3. This is the feature of the present invention. In the case of (4), if the signal of the input terminal T2 is synchronized with the signal of the output terminal T3 as in the cases of (1) to (3), the display control signal (pulse signal) of "L/H" is output from the output terminal T3 thereby flashing the light emitting diode LED 2. On the contrary, if the display control signal is fixed to "L" as in the present invention, the transistor Q3 is turned OFF, and as a result, the light emitting diode LED 2 is in a non-lighted state, and "disc not present" is specifically displayed.

In the above embodiment, the signal of the input terminal T2 and the signal of the output terminal T3 are not synchronized only when the pulse signal of "L/H" is input to the input terminal T2 of the microcomputer 17, and the display control signal fixed to "L" is output from the output terminal T3, as described above. Thus, in a state the power is turned OFF and the disc 14 is not inserted into the slot 4, the light emitting diode LED 2 does not flash, and the fact that the disc is not present is accurately informed by not lighting the light emitting diode LED 2. Therefore, the user does not mistakenly recognize break down, or mistakenly recognize that the disc is present when the disc 14 is not present in the slot 4. The presence of the disc is thus accurately informed to the user. As a result, the state of mistakenly performing the reproducing operation or the recording operation without the disc is avoided.

In the present embodiment, since the presence of the disc is reliably displayed by one light emitting diode LED 2 without arranging two light emitting diodes as in Japanese Laid-Open Utility Model Publication No. 5-21397, the cost of the components is reduced. Further, it can be performed by simply changing one part of the processing program of the microcomputer 17, and thus a new hardware does not need to be added, and can be easily achieved without increasing the cost.

In the above embodiment, the LED is given by way of example of the light emitting element 5 for displaying the presence of the disc, but the light emitting element 5 may be a lamp. Further, the liquid crystal television is given by way of example in the above embodiment, but the present invention is also applicable to plasma display television and the like, and is also applicable to audio equipment and the like other than television.

What is claimed is:
1. A television with disc loader comprising:
a slot for inserting and ejecting a disc;
a slot-in type disc loader for taking in the disc inserted into the slot;
a disc detecting section, including a light projecting element and a light receiving element, for detecting the disc when a light from the light projecting element to the light receiving element is interrupted by the disc when the disc is inserted into the slot;
a microcomputer for determining an output of the disc detecting section and outputting a display control signal based on the detected result; and a displaying section for displaying a presence of the disc in the slot by a light emitting state of a light emitting diode that is lighted on or lighted out by the display control signal; wherein the light projecting element in the disc detecting section is driven by a continuous signal output from the microcomputer and projects a continuous light when the power of the television is turned ON, and is driven by a pulse signal output from the microcomputer and projects a pulse light when the power of the television is turned OFF, the power of the television being turned ON in response to the interrupting of the pulse light by the disc and the detection of the disc;

the microcomputer determines the output of the disc detecting section as the pulse signal when the power of the television is turned OFF and the disc is not detected by the disc detecting section, and outputs the display control signal for lighting out the light emitting diode to the displaying section.

2. A disc presence display device mounted on equipment such as television incorporating a slot-in type disc loader, the device comprising:

a disc detecting section, including a light projecting element and a light receiving element, for detecting the disc when a light from the light projecting element to the light receiving element is interrupted by the disc, the light projecting element projecting a continuous light when the power of the equipment is turned ON and projecting a pulse light when the power of the equipment is turned OFF;

a controlling section for determining the output of the disc detecting section and outputting a display control signal based on the determined result; and a displaying section for displaying the presence of the disc by a light emitting state of a light emitting element that is lighted on or lighted out by the display control signal; wherein the controlling section determines the output of the disc detecting section as the pulse signal when the power of the equipment is turned OFF and the disc is not detected by the disc detecting section, and outputs the display control signal for lighting out the light emitting element to the displaying section.

* * * * *